United States Patent [19]
Eng et al.

[11] Patent Number: 5,457,679
[45] Date of Patent: Oct. 10, 1995

[54] CHANNEL SHARING AND MEMORY SHARING IN A PACKET SWITCHING SYSTEM

[75] Inventors: Kai Y. Eng, Atlantic Highlands; Richard D. Gitlin, Little Silver; Mark J. Karol, Fair Haven, all of N.J.

[73] Assignee: AT&T Corp., Murray Hill, N.J.

[21] Appl. No.: 164,075

[22] Filed: Dec. 8, 1993

[51] Int. Cl.$^6$ ................................................. H04L 12/56
[52] U.S. Cl. ........................................ 370/16; 370/60
[58] Field of Search .................... 370/16, 58.1, 60, 370/60.1, 85.6, 85.8, 85.13, 94.1; 340/825.1; 371/8.2

[56] References Cited

U.S. PATENT DOCUMENTS

| | | | |
|---|---|---|---|
| 5,048,013 | 9/1991 | Eng et al. | 370/79 |
| 5,271,004 | 12/1993 | Proctor et al. | 370/60 |
| 5,291,482 | 3/1994 | McHarg et al. | 370/60.1 |
| 5,301,055 | 4/1994 | Bagchi et al. | 370/60.1 |

OTHER PUBLICATIONS

Kai Y. Eng and Mark J. Karol, "High–Performance Techniques For Gigabit ATM Switching and Networking", IEEE International Conference on Communications '93, May 23–26, 1993, Geneva Switzerland.

Kai Y. Eng, Mark J. Karol and Richard D. Gitlin, "Congestion Control in a National Broadband Network by Channel Sharing", Proc. 7th ITC Seminar, Morristown, N.J., Oct. 9–11, 1990, paper #12, 3.

Kai Y. Eng, Mark J. Karol, Richard D. Gitlin, "Memory and Channel Sharing Techniques for Congestion Control in ATM Networks" IEEE Infocom '93, The Conference on Computer Communication, Mar. 28–Apr. 1, 1993.

Kai Y. Eng, Mark J. Karol, Yu–Shuan Yeh, "A Growable Packet (ATM) Switch Architecture: Design Principles and Applications", IEEE Transactions on Communications, vol. 40, No. 2, Feb. 1992.

Kai Y. Eng and Mark J. Karol, "The Growable Switch Architecture: A Self-Routing Implementation For Large ATM Applications", IEEE, 1991.

*Primary Examiner*—Benedict V. Safourek

[57] ABSTRACT

The present invention concerns a method and apparatus for memory and channel sharing in a communication switching network which uses packet switching. In one form of the invention memory and channel sharing is provided within a packet switch. The packet switch includes a memory for storing a plurality data packets and a router that routes data packets from the memory to a particular output port. The router is operable to route data packets to either a dedicated output port, in other words, an output port defined by the virtual circuit path of the data packet, or a shared output port. In another form of the invention memory and channel sharing is provided by a packet switch in conjunction with a terminal. Protection lines which are provided in transmission systems can be used as the shared channels.

32 Claims, 4 Drawing Sheets

CHANNEL SHARING AND MEMORY SHARING IN A PACKET SWITCHING SYSTEM

FIELD OF THE INVENTION

The present invention relates to alleviating congestion and reducing buffer requirements in a network which uses packet switching.

BACKGROUND OF THE INVENTION

Communication switching systems provide communication between sources and destinations in networks such as telephone networks and computer networks. One type of communication switching system is packet switching. In packet switching, a message from a source is split up into smaller pieces or packets. Routing information is added to each packet so that the packet can be delivered to its proper destination. The packets are output from a source to an intermediate packet switch, stored at that packet switch, then forwarded to subsequent intermediate packet switches, which also store and forward the packets, in the same manner, until the packets reach their destination.

Packet switching systems are generally of two types: (1) datagram and (2) virtual circuit systems. In datagram packet switching systems all routing information is contained in the packet in an address header. The packet can be output on any communication line. Each packet can take a different path and therefore a sequence number is required so that when the packets reach their destination they can be put back together in the correct sequence to form the original message. Datagram packet switching has drawbacks in that the packets can get out of sequence.

In a virtual circuit packet switching system, all packets are output over the same path for a certain period of time. The source and the destination agree on the path before packets are transmitted. After the path is agreed upon, routing information is setup in each intermediate packet switch which will be part of the path. The routing information in the intermediate packet switches is used in conjunction with an address header in the packets and with the input port or line that the packets come in on to route the packets.

The drawback to current virtual circuit packet switching systems is that unlike datagrams, packets must use the same path for a certain period of time. This is true even if several communication lines are provided from one intermediate packet switch to another. Using the same path allows a packet switch to route packets to an output port based on the input port or line that the packet come in on. Because delay and/or loss of packets may result when a large number of source-destination combinations use the same communication line, there is a need for the use of multiple communication lines.

Packet switches, whether they employ virtual circuit or datagram techniques, require memory for storing packets. The memory can comprise an output queue for each output port of the packet switch. When the packets are input, they can be stored in the appropriate output queue and then output in a first in first out (FIFO) manner. Techniques are also known for sharing memory between a plurality of output ports, by, for example, storing packet addresses in output queues.

SUMMARY AND OBJECTS OF THE INVENTION

One of the objects of the present invention is to provide a method and apparatus which reduces buffer space and increases throughput in a packet switch.

In one form of the invention, reduction of buffer space and increased throughput is achieved by providing memory sharing and channel sharing in a packet switch which normally operates in a virtual circuit mode. In another form of the invention, this improvement is achieved by employing memory sharing and channel sharing in the combination of a packet switch and a transmission terminal which normally operate in a virtual circuit mode. Although not preferred, channel sharing can be employed in a packet switch without memory sharing. The present invention is particularly useful in Asynchronous Transfer Mode (ATM) switching systems, which are being standardized as a switching technique for Broadband Integrated Services Digital Network (B-ISDN) systems.

It is another object of the present invention to provide a method and apparatus for using protection lines employed in transmission line systems in a channel sharing mode. In one form of the present invention, for every two packets destined for the output port with the longest output queue, one packet is output to that output port and one packet is output to an output port which is connected to a protection line.

In one embodiment of the invention, a packet switch is provided which has a plurality of output ports equal to the number of service lines and protection lines in the transmission system in which the packet switch is to be utilized. In another embodiment, the packet switch outputs data to a transmission line system at a speed which allows a terminal to provide channel sharing.

The present invention is particularly applicable to generic backbone ATM networks of ATM packet switches interconnected with high speed optical links.

DETAILED DESCRIPTION

Figure 1:
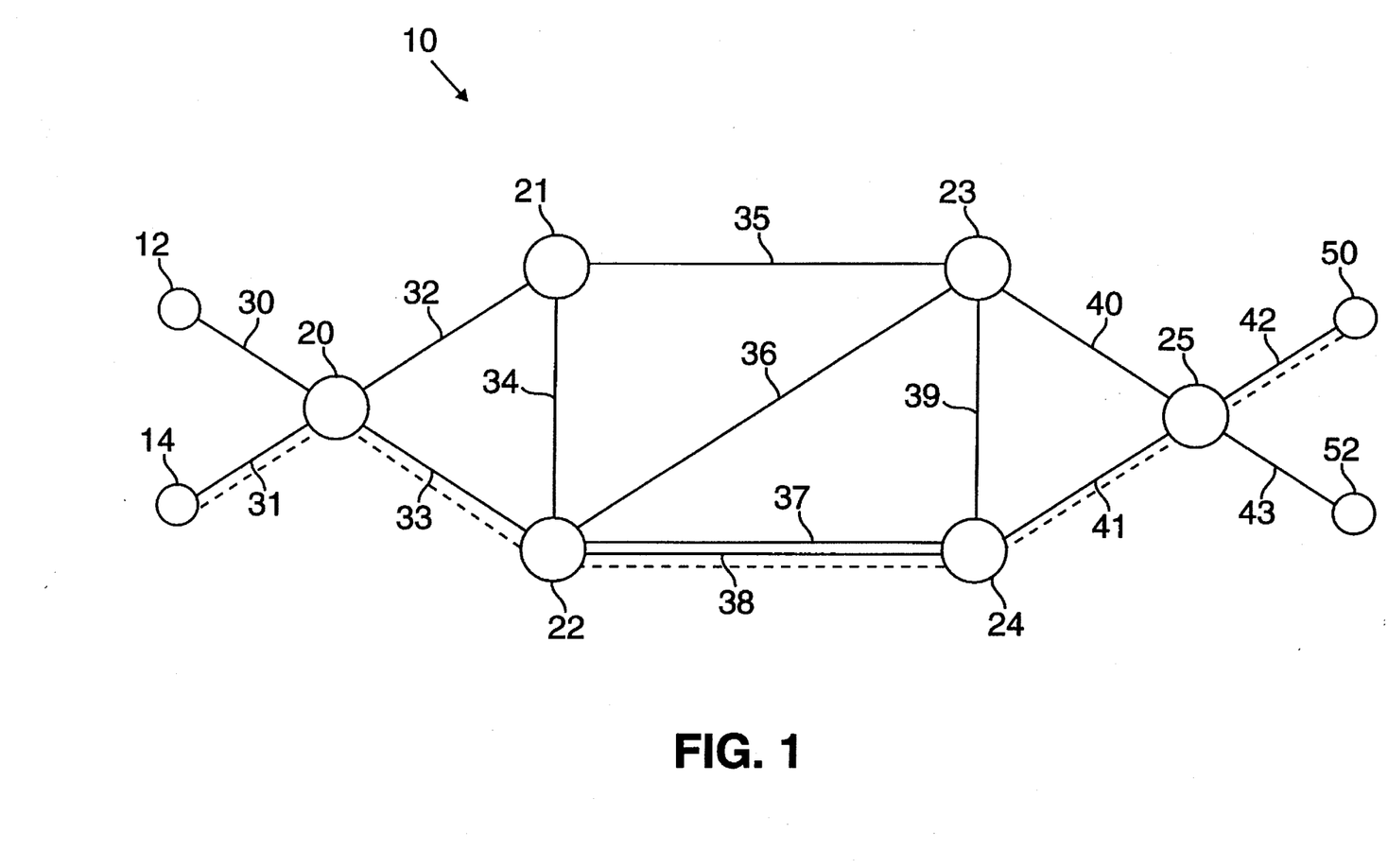
FIG. 1 illustrates a simplified packet switching network.

FIG. 1 shows a simplified packet switching network 10 comprising sources 12 and 14, packet switches 20, 21, 22, 23, 24, and 25, communication lines 30–43 and destinations 50 and 52.

The sources 12 and 14 are connected to packet switch 20 by communication lines 30 and 31 respectively. Packet switch 20 is in turn connected by communication lines 32 and 33 to packet switches 21 and 22 respectively. Packet switch 21 is connected by communication line 35 to packet switch 23 and by communication line 34 to packet switch 22. Packet switch 22 is connected by communication line 36 to packet switch 23. Packet switch 22 is also connected by communication lines 37 and 38 to packet switch 24. Packet switch 23 is connected by communication lines 39 and 40 to packet switches 24 and 25. Packet switch 24 is connected by communication line 41 to packet switch 25. Packet switch 25 is connected by communication lines 42 and 43 to destinations 50 and 52, respectively.

There are a variety of paths through the packet switching network 10 that a packet from source 14 can take in order to get to destination 50. For example, one such path is shown in FIG. 1 by the dotted line. Following this dotted line path, a packet is output from source 14 on communication line 31 to packet switch 20 where the packet is stored. The packet is later forwarded to packet switch 22 through communication line 33. The packet is stored in packet switch 22 and later forwarded through communication line 38 to packet switch 24. The packet is stored in packet switch 24 and later forwarded through communication line 41 to packet switch 25. The packet is stored in packet switch 25 and later forwarded through communication line 42 to destination 50.

The packet switching network 10 shown in FIG. 1 normally operates in a virtual circuit mode. In this virtual circuit mode, the source 14 and destination 50 agree on the particular communication path on which packets will pass before packets are transmitted. After agreeing on a path, routing information is set up in each intermediate packet switch in the path. Thus, if the dotted line path is agreed upon by the source 14 and destination 50, routing information is setup in packet switches 20, 22, 24, and 25. In addition, the packet to be transmitted will also contain some routing data in an address header.

The present invention allows packets which are normally transmitted in a virtual circuit mode to be transmitted along a different path when two packet switches are connected by more than one communication line. For example, the dotted line path in FIG. 1 includes the communication line 38 between the packet switches 22 and 24. Although the packet switches 22 and 24 are also connected by the communication line 37, in a normal virtual circuit mode, packets will not be transmitted over communication line 37. This is because in most virtual circuit systems, the input line or port the packet comes in on is part of the information used to route the packet to a particular output. Using the input port for routing reduces the routing information required in the packet's address header and in the packet switch.

In one form of the present invention, if the communication line 38 is congested, packets can be rerouted on communication line 37. To this end, the packet switch 22 sends the packet switch 24 a control signal, for example, over communication line 38 to indicate that some packets which normally would be sent out over communication line 38 will be rerouted out over communication line 37. Further details of this rerouting are discussed below in connection with FIG. 2.

The present invention also preferably employs memory sharing. For example, in FIG. 1, a memory for storing packets in packet switch 22 for later outputting onto either of the communication lines 37 and 38 is shared. Further details of the memory sharing operation of the present invention are described below in connection with FIG. 2.

Figure 2:
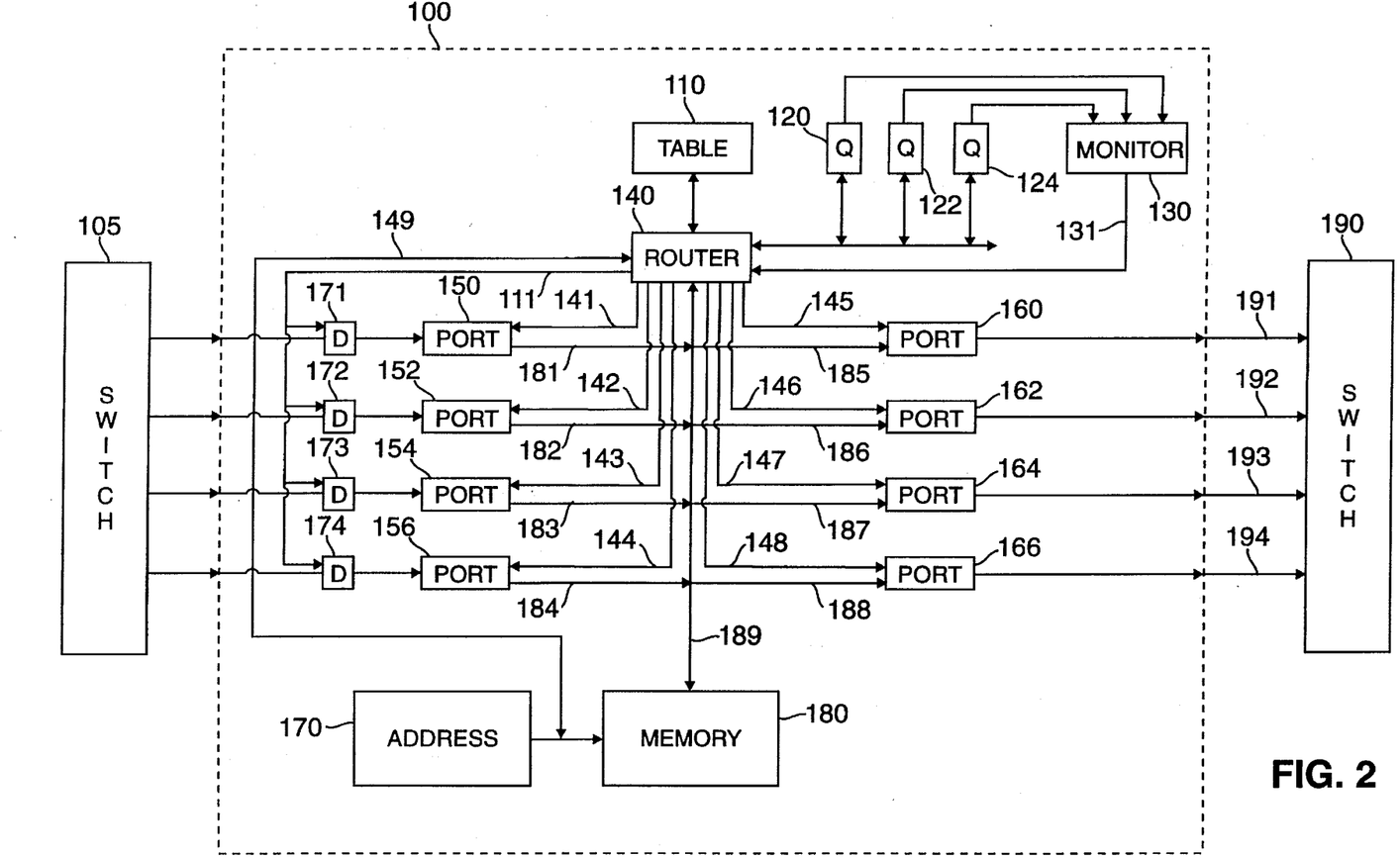
FIG. 2 illustrates one packet switch which employs memory sharing and channel sharing connected to an upstream packet switch and a downstream packet switch.

FIG. 2 shows an exemplary intermediate packet switch 100 in accordance with the present invention connected to an upstream packet switch 105 and a downstream packet switch 190. The packet switch 100 includes routing table 110, output queues 120, 122, and 124, monitor 130, packet router 140, input ports 150, 152, 154, and 156, output ports 160, 162, 164, and 166, address generator 170, shared memory 180, and delay circuits 171, 172, 173, and 174. Although, four input ports and four output ports are shown, a greater or lesser number of ports can be provided. Furthermore, an unequal number of input ports and output ports may be provided. The number of output queues may vary but corresponds to the number of "dedicated" output ports as will be described below.

The monitor 130 includes a control line 131, which is connected to an input of packet router 140. Packet router 140 includes read lines 141, 142, 143, and 144 which are connected to control inputs of input ports 150, 152, 154, and 156 respectively and write lines 145, 146, 147, and 148, which are connected to control inputs of output ports 160, 162, 164, and 166 respectively. The packet router 140 also includes a bidirectional address line 149 which is connected to an address input of memory 180 and to the output of address generator 170. Packet router 140 further includes delay line 111 connected to an input of delay circuits 171–174.

Output ports 160, 162, 164, and 166 are connected to service lines 191–193, and a protection line 194 respectively. Lines 191–194 connect the packet switch 100 to the downstream packet switch 190. Shared memory 180 includes an input/output data bus 189. The input ports 150, 152, 154, and 156 connect the packet switch 100 with the upstream packet switch 105 through delay circuits 171–174. The input ports 150, 152, 154, and 156 also include output lines 181–184 respectively, which are connected to the data bus 189. Output ports 160, 162, 164, and 166 also include input lines 185–188 respectively, which are also connected to the data bus 189.

Packet switch 100 illustrates one example of the channel sharing and memory sharing according to the present invention. During a single input cycle, also known as an input time slot, packets are sequentially input on the input ports 150, 152, 154, and 156. The input ports 150, 152, 154, and 156 are connected to output ports of the upstream packet switch 105 through delay circuits 171–174. The input ports 150, 152, 154, and 156 each include buffering, for temporarily storing a single packet. A packet is input through the input port 150, for example, when the packet router 140 activates the read line 141 for input port 150. This allows the packet from input port 150 to be output on output line 181 onto data bus 189 and to be written into the shared memory 180. The address where a given packet will be stored in memory 180 is generated by address generator 170 which contains a pool of available addresses in shared memory 180.

The address generated is also input to packet router 140 through bidirectional address line 149. The packet router 140 also receives the packet itself through data bus 189. Using address information in the packet, the knowledge of the input port that the packet came in on, and routing information which is stored in routing table 110, the packet router 140 routes packet addresses to one of the output queues 120, 122, and 124. For input port 156, which is used as a shared input port, the packet router also uses previous control information which indicates which port the packet normally would have come in on, i.e. one of output ports 150, 152, or 154, to determine which output queue to route the packet address to. The control information came from the upstream packet switch 105, through one of the input ports 150, 152, or 154. For example, if packets normally intended for input port 150 are going to be sent over shared input port 156, a control signal will be sent to input port 150. The control signal can be appended to the end of a packet sent to input port 150.

The length of delay for delay circuits 171–174 is controlled by the delay line 111. The delays for each delay circuit 171–174 can be set in sequence by delay line 111. The delay line 111 may be comprised of four separate delay lines. The delays are set so that packets are input in the same order that they were output. For example, if an upstream packet switch 105, first outputs packet "A" to input port 150 of packet switch 100, then packet "B" to input port 152, then packet "C" to input port 154 and then packet "D" to input port 156, the packet switch 100 should input packet "A" first and then packets "B", "C", "D". However, the packet "A" may arrive at packet switch 100 after packet "B" because of differences in propagation delays between the communication lines over which packets "A" and "B" pass.

The delays for delay circuits 171–174 are set so that packets arrive at the input ports in the same sequence as they were originally transmitted from the upstream packet 105. For example, if the propagation delay through the communication line connected to input port 150 is longer than the propagation delays for communication lines connected to the other input ports 152, 154, and 156, the delay circuits 172–174 can be set to delay the arrival of, for example packets "B", "C", and "D" so that they arrive at the same time as packet "A".

During a single output cycle, also known as an output time slot, the packet router 140 routes packets onto output ports 160, 162, 164, and 166 in sequence. The particular sequence is a matter of choice. However, the same sequence is executed throughout the operating of the packet switch. An exemplary single output cycle is described as follows. Packet router 140 first inputs a packet address from an output queue, for example, output queue 120. The packet address is sent through packet router 140 to address line 149 and is used to access a packet in shared memory 180. The packet is accessed from memory 180 and output on the data bus 189. The output port 160 corresponding to the output queue 120, is then enabled by activating the write line 145. The packet is output from the data bus 189 through input line 185 to output port 160.

Packet addresses for output queues 122 and 124 are retrieved by the packet router 140 and packets are output on output ports 162 and 164 respectively in the same manner as for output queue 120 and output port 160. The output ports 160, 162, and 164 are dedicated to their respective output queues 120, 122, and 124.

When a packet has been output for one packet address in each output queue, the data router 140 next outputs a packet from the longest output queue, i.e. the output queue with the greatest number of packet addresses, to the shared output port 166. The longest output queue is determined by monitor 130 and this information is supplied to packet router 140 through control line 131. Monitor 130 has three internal counters, one for each output queue. Each counter keeps count of the number of addresses in its corresponding output queue. The counts are compared to one another by monitor 130 to determine the longest output queue.

A single output cycle is complete when four packets have been output, one to each output port. Before outputting packets to the shared output port 166, a control signal can be sent to one of the output ports to inform the downstream packet switch 190 that packets, normally sent to a given output port will be sent to the shared output port. For example, if output queue 120 is the longest output queue, a control signal will be output to output port 160 indicating that packets normally communicated to output port 160 will be communicated to output port 166. The control signal preferrably is output only to indicate a change in which output queue is using the shared output port. The control signal can be appended to a packet output, for example, to output port 160.

If one of the lines 191–194 is inoperable, the channel sharing operation of the present invention preferably is discontinued. The packet router 140 can test the lines 191–194 periodically to see if they are operating properly and the packet router 140 can discontinue channel sharing if a service line or a protection line is inoperable.

Although FIG. 2 shows the packet switch 100 connected to packet switch 190 only by output lines and to the packet switch 105 only by input lines, packet switches generally are connected to other packet switches by both input and output lines or by bidirectional lines. The diagram in FIG. 2 was simplified to demonstrate the input and output time slots of a packet switch, such as packet switch 100.

Figure 3:
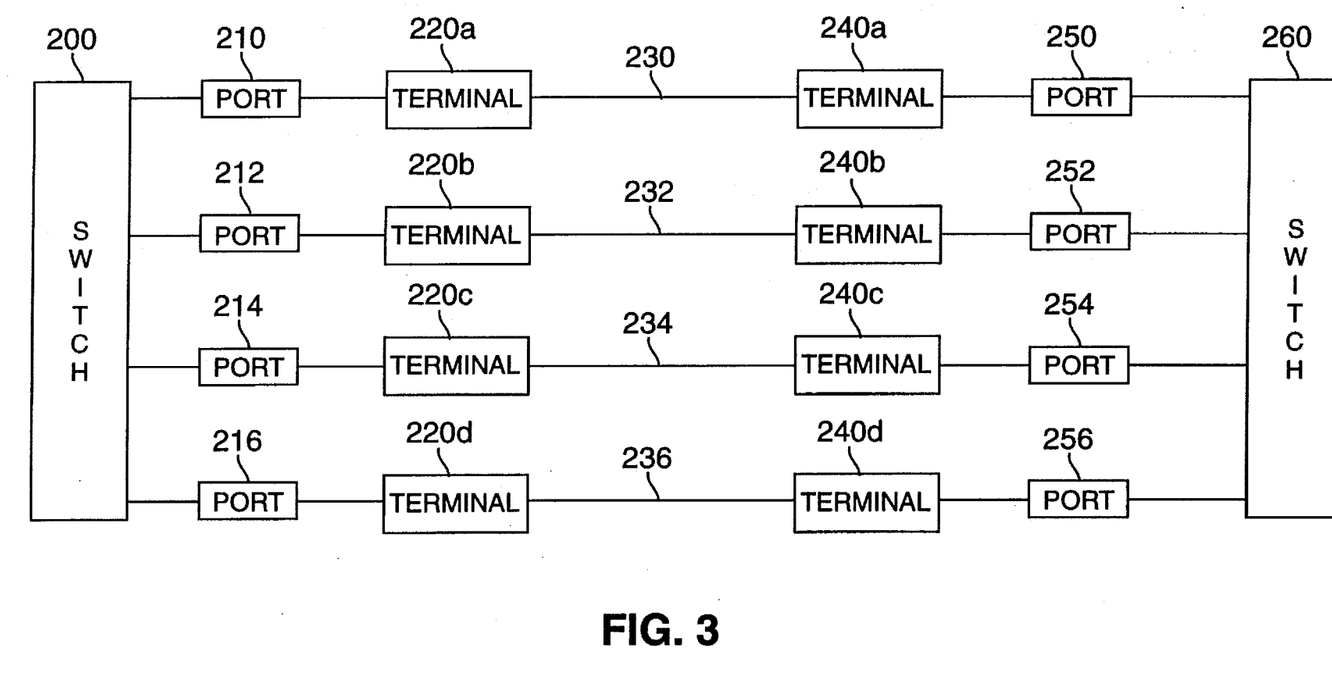
FIG. 3 illustrates the interconnection between intermediate packet switches through lightwave terminals where memory and channel sharing are employed in the packet switches.

Referring to FIG. 3 there is shown the interconnection of packet switches by lightwave terminals. In FIG. 3 the packet switches provide memory and channel sharing similar to the embodiment of FIG. 2. Two packet switches 200 and 260 are connected by output ports 210, 212, 214, and 216, lightwave terminal 220, optical communication lines 230, 232, 234, and 236, lightwave terminal 240, and input ports 250, 252, 254, and 256. The packet switches 200 and 260 may be of the form shown for packet switch 100 in FIG. 2. Communication lines 230, 232, and 234 are service lines which are used to transmit packets during normal operation. Communication line 236 is a protection line. Such protection lines are backup redundant lines provided in many transmission systems to furnish the capability of communicating over another communication line when one of the service lines is inoperable. In one embodiment of the present invention, the protection line 236 is used during normal operation in a packet switching system which operates in virtual circuit mode to relieve congestion. Packets can be output in one mode to output ports 210, 212, and 214, which are connected to lightwave terminal 220, subsequently to communication lines 230, 232, and 234, lightwave terminal 240, and finally to input ports 250, 252, and 254 of packet switch 260.

In addition, a packet which is intended to be output on the output port 210 can be output on the output port 216 and subsequently to lightwave terminal 220, communication line 236, lightwave terminal 240, and finally to input port 256 of the packet switch 260. A control signal is output by packet switch 200 on its output port 210 to indicate to packet switch 260 that packets or a packet coming out at output port 216 were originally intended to go out on output port 210. A separate control line could also be provided. Packet switch 260 then puts the packets from output port 216 and output port 210 back together in their original sequence by inputting packets in the same order that they were output. Delay circuits can be provided as shown in FIG. 2 to correct for differences in propagation delay between packets sent to input ports 250, 252, 254, and 256.

Figure 4:
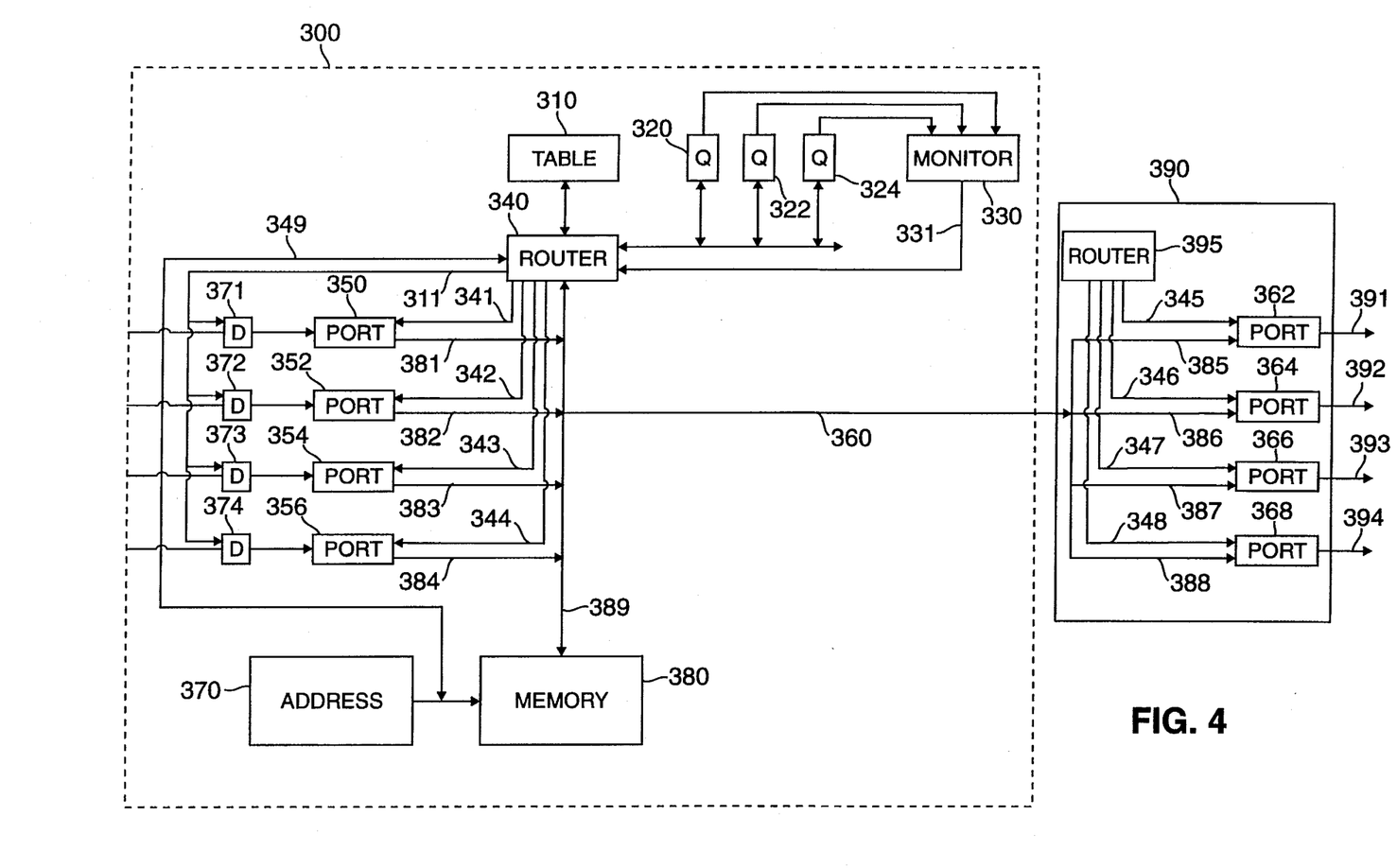
FIG. 4 illustrates memory and channel sharing employed in a packet switch in combination with a lightwave terminal.

FIG. 4 illustrates an example where the functions of memory sharing and channel sharing are provided by a packet switch in conjunction with a lightwave terminal. FIG. 4 shows an exemplary intermediate packet switch 300 in accordance with the present invention connected to a lightwave terminal 390.

The packet switch 300 includes routing table 310, output queues 320, 322, and 324, monitor 330, packet router 340, input ports 350, 352, 354, and 356, output port 360, address generator 370, shared memory 380, and delay circuits 371, 372, 373, and 374. The monitor 330 includes a control line 331, which is connected to an input of packet router 340. Packet router 340 includes read lines 341, 342, 343, and 344 which are connected to control inputs of input ports 350, 352, 354, and 356 respectively. The packet router 340 also includes a bidirectional address line 349 which is connected to an address input of memory 380 and to the output of address generator 370. Packet router 340 further includes delay line 311. Shared memory 380 includes an input/output data bus 389. The input ports 350, 352, 354, and 356 also include output lines 381–384 respectively, which are connected to the data bus 389. Delay circuits 371–374 include a input which is connected to delay line 311.

Lightwave terminal 390 includes output ports 362, 364, 366, and 368 and packet router 395. Packet router 395 in lightwave terminal 390 includes write lines 345, 346, 347, and 348, which are connected to control inputs of output ports 362, 364, 366, and 368 respectively. Output ports 362, 364, 366, and 368 of lightwave terminal 390 are connected to service lines 391–393, and a protection line 394 respectively. Lines 391–394 connect the lightwave terminal 390 to another lightwave terminal in a manner similar to that shown in FIG. 3. Output ports 362, 364, 366, and 368 are connected input ports 385–388 respectively. Input ports 385–388 are connected to output port 360 of packet switch 300.

Packet switch 300 functions in combination with lightwave terminal 390 to provide memory and channel sharing in accordance with the present invention. Various functions for memory and channel sharing which were provided solely by packet switch 100 in FIG. 2 are divided in FIG. 4 between the packet switch 300 and the lightwave terminal 390. However, the memory and channel sharing operation of the combination of packet switch 300 and lightwave terminal 390 is similar to the operation of packet switch 100 of FIG. 2.

The description for the input cycle or input time slot given with respect to the packet switch 100 of FIG. 2 is the same for the packet switch 300. During a single input cycle packets are sequentially input at the input ports 350, 352, 354, and 356. The input ports 350, 352, 354, and 356 each include buffering, for temporarily storing a single packet. A packet is input through the input port 350, for example, when the packet router 340 activates the read line 341 for input port 350. This allows the packet from input port 350 to be output on output line 381 onto data bus 389 and to be written into the shared memory 380. The address where a given packet will be stored in memory 380 is generated by address generator 370 which contains a pool of available addresses in shared memory 380.

The address generated is also input to packet router 340 through bidirectional address line 349. The packet router 340 also receives the packet itself through data bus 389. Using address information in the packet, the knowledge of the input port that the packet came in on, and routing information which is stored in routing table 310, the packet router 340 routes packet addresses to one of the output queues 320, 322, and 324. For input port 356, which is used as a shared input port, the packet router also uses previous control information which indicates which port the packet normally would have come in on i.e. input port 350, 352, or 354 to determine which output queue to route the packet address to. The control information comes from an upstream packet switch as described for FIG. 2, which sends a control signal to one of the input ports 350, 352, or 354 to indicate that packets normally intended for one of those ports will be sent to the shared port 356.

The length of delay for delay circuits 371–374 is controlled by the delay line 311. The delays for each delay circuit 371–374 can be set in sequence by delay line 311. The delay line 311 may be comprised of four separate delay lines. The delays are set so that packets are input in the same order that they were output as described with reference to FIG. 2.

The embodiment of FIG. 4 differs from that of FIG. 2 in that tasks for an output cycle are distributed between the packet switch 300 and the lightwave terminal 390. An exemplary single output cycle is described as follows. Packet router 340 first inputs a packet address from an output queue, for example, output queue 320. The packet address is sent through packet router 340 to address line 349 and is used to access a packet in shared memory 380. The packet is accessed from memory 380 and output on the data bus 389.

The packet switch 300 of FIG. 4 unlike the packet switch 100 of FIG. 2, has only a single output port 360. After a packet is output on the data bus 389 it is sent to the output port 360. From there the packet is transmitted to the lightwave terminal 390. The packet router 395 of the lightwave terminal 390 routes packets from the output port 360 of the packet switch to one of the output ports 362, 364, 366 and 368 of the lightwave terminal 390 in sequence. The particular sequence is a matter of choice. However, the same sequence is executed throughout the operation of the packet switch 300 and the lightwave terminal 390.

An exemplary single output cycle of the packet switch and lightwave terminal memory and channel sharing of FIG. 4 is described as follows. Output port 362 corresponding to the output queue 120, is enabled by packet router 395 activating the write line 345. The packet is sent from output port 360 of the packet switch 300 to the input port 385 of the output port 362 of the lightwave terminal 390, and then to the output port 362 of the lightwave terminal 390.

Packet addresses for output queues 322 and 324 are retrieved by the packet router 340 and packets are output first to output port 360 of packet switch 300 and then to output ports 364 and 366 of lightwave terminal 390 in the same manner as for output queue 320 and output port 362. The output ports 362, 364, and 366 of the lightwave terminal are thus dedicated to the respective output queue 320, 322, and 324 of the packet switch 300.

When a packet has been output for one packet address in each output queue, the packet router 340 of the packet switch 300 next outputs a packet whose packet address is in the longest output queue. The longest output queue is the output queue with the greatest number of packet addresses. The longest output queue is determined by monitor 330 and this information is supplied to packet router 340 through control line 331. Monitor 330 has three internal counters, one for each output queue. Each counter keeps a count of the number of addresses in its corresponding output queue. The counts are compared to one another to determine the longest output queue.

A single output cycle or output time slot is complete when four packets have been output in sequence to packet switch 300's output port 360. Before outputting the fourth packet to the output port, a control signal is sent over output port 360 of packet switch 300 to lightwave terminal 390 to inform a downstream packet switch that packets, normally sent to a given output port will be sent to a shared output port. For example, if output queue 320 is the longest queue, a control signal will be output on output port 360 indicating that two packets will be output during an output cycle from the output queue 320. The control signal can be output only to indicate a change in which output queue is using the shared output port. A control signal can be appended to the output of a packet corresponding to an particular output queue. For example if an extra packet will be output from output queue 320, during the normal output of a packet corresponding to output queue 320 a control signal can be appended onto the packet, to indicate that an extra packet will come from output queue 320.

In the embodiments of FIGS. 3 and 4, the packet switch may also be coupled to a line card interface instead of a light wave terminal.

The present invention can use other memory sharing techniques known in the art other than the memory sharing technique shown in FIGS. 2 and 4. In some cases channel sharing is best implemented inside the packet switch as in the packet switch 100 of FIG. 2, as opposed to in conjunction with a terminal as in FIG. 4, so that any spare external line can be used as a protection line for any service line.

The packet switches preferably perform routing and buffering as an ideal packet switch operating in virtual circuit mode as known in the art.

Combining memory and channel sharing yields a substantial improvement in delay-throughput performance and also reduces overall buffering requirements significantly.

Channel sharing can be implemented without memory sharing. Separate memory in the form of one output queue for each output port can then be provided. The output queues in a non-memory sharing case would store the packets themselves instead of packet addresses as in the memory sharing case of FIGS. 2 and 4.

We claim:

1. A packet switch for a packet switching system comprising:

an input port, a plurality of output ports comprising at least one dedicated output port and at least one shared output port, a first memory, having an address input, a data input connected to the input port, and a data output connected to the output ports, an address generator for supplying a packet address to the address input of the first memory, a second memory comprising at least one output queue for storing packet addresses, each output queue corresponding to a dedicated output port, a routing table comprising data and having an output, a packet router, having a first input connected to the address generator and a second input connected to the output of said routing table, said packet router including first control means for routing each packet address from said address generator to one of said output queues based on data from the routing table, and second control means for routing each packet from said first memory to one of said output ports, wherein said second control means, during a single output cycle, routes at least one packet to the dedicated output port corresponding to the output queue where the packet's address was stored, and routes at least one packet to a shared output port.

2. The packet switch of claim 1 and wherein the second control means routes at least one packet to a shared output port based on the length of one or more output queues.

3. The packet switch of claim 1 and wherein routing of packet addresses by the first control means is also based on the input port the corresponding packet is received on and packet routing data in the corresponding packet.

4. The packet switch of claim 1 and wherein the packet switch is comprised of a plurality of output queues and said second control means routes at least one packet to a shared output port whose corresponding packet address was stored in the longest output queue.

5. The packet switch of claim 4 and wherein the second control means comprises a monitor for determining the longest output queue.

6. The packet switch of claim 5 and wherein said monitor further comprising a counter for each output queue to count the number of packet addresses in each output queue.

7. The packet switch of claim 1 and wherein the packet switch is an ATM packet switch.

8. A packet switch for a packet switching system comprising:

an input port, a plurality of output ports comprising at least one dedicated output port and at least one shared output port, a memory for inputting packets, storing packets, and outputting packets, said memory comprising at least one output queue, each output queue corresponding to a dedicated output port, a routing table comprising data and having an output, a packet router, having a first input connected to said input port and a second input connected to the output of said routing table, said packet router including first control means for routing each packet from said input port to one of said output queues based on data from the routing table, and second control means for routing each packet from one of said output queues to an output port, wherein said second control means is adapted during a single output cycle to route at least one packet from an output queue to its dedicated output port and at least one packet from the same output queue to a shared output port.

9. The packet switch of claim 8 and wherein the second control means routes at least one packet to a shared output port based on the length of one or more output queues.

10. The packet switch of claim 8 and wherein the routing of packets by the first control means is also based on the input port the packet is received on and packet routing data in the packet.

11. The packet switch of claim 9 and wherein the packet switch is comprised of a plurality of output queues and said second control means routes at least one packet to a shared output port from the longest output queue.

12. The packet switch of claim 11 and wherein the second control means comprises a monitor for determining the longest output queue.

13. The packet switch of claim 12 and wherein said monitor further comprising a counter for each output queue to count the number of packets in each output queue.

14. The packet switch of claim 8 and wherein the packet switch is an ATM packet switch.

15. An apparatus for a packet switching system comprising:

a packet switch comprising:

an input port, an output port, a first memory, having an address input, a data input connected to the input port, and a data output connected to the output port, an address generator for supplying a packet address to the address input of the first memory, a second memory comprising at least one output queue for storing packet addresses, a routing table comprising data and having an output, a packet router, having a first input connected to the address generator and a second input connected to the output of said routing table, said packet router including first control means for routing each packet address from said address generator to one of said output queues based on data from the routing table, and second control means for routing one packet, for each output queue during a single output cycle, from said first memory to a first output port, wherein said second control means also routes at least one extra packet during a single output cycle from said first memory to the first output port based on the length of one or more output queues, a terminal having at least one input port connected to at least one output port of the packet switch, said terminal having a plurality of output ports, wherein the terminal inputs at least two packets at one of its input ports corresponding to a single output queue of the packet switch and further wherein said terminal outputs at least one of the at least two packets to a first output port of said terminal and at least one of the at least two packets to a second output port of said terminal.

16. The apparatus of claim 15 and wherein routing of packet addresses by the first control means is also based on the input port the corresponding packet is received on and packet routing data in the corresponding packet.

17. The apparatus of claim 15 and wherein the packet switch is comprised of a plurality of output queues and said second control means routes at least one extra packet to a first output port during a single output cycle, said extra packet's corresponding packet address having been stored in the longest output queue.

18. The apparatus of claim 17 and wherein the second control means comprises a monitor for determining the longest output queue.

19. The apparatus of claim 18 and wherein said monitor further comprising a counter for each output queue to count the number of packet addresses in each output queue.

20. The apparatus of claim 15 and wherein the packet switch is an ATM packet switch.

21. An apparatus for a packet switching system comprising:

a packet switch comprising:
 an input port,
 an output port,
 a memory for inputting packets, storing packets, and outputting packets, said memory comprising at least one output queue,
 a routing table comprising data and having an output,
 a packet router, having a first input connected to said input port and a second input connected to the output of said routing table, said packet router including first control means for routing each packet from said input port to one of said output queues based on data from the routing table, and second control means for routing one packet, for each output queue during a single output cycle, from said memory to a first output port, wherein said second control means also routes at least one extra packet during a single output cycle from said memory to the first output port based on the length of one or more output queues, a terminal having at least one input port connected to at least one output port of the packet switch, said terminal having a plurality of output ports, wherein the terminal inputs at least two packets at one of its input ports corresponding to a single output queue of the packet switch and further wherein said terminal outputs at least one of the at least two packets to a first output port of said terminal and at least one of the at least two packets to a second output port of said terminal.

22. The apparatus of claim 21 and wherein routing of packets by the first control means is also based on the input port the packet is received on and packet routing data in the packet.

23. The apparatus of claim 21 and wherein the packet switch is comprised of a plurality of output queues and said second control means routes at least one extra packet during a single output cycle from the longest output queue to a first output port.

24. The apparatus of claim 23 and wherein the second control means comprises a monitor for determining the longest output queue.

25. The apparatus of claim 24 and wherein said monitor further comprising a counter for each output queue to count the number of packets in each output queue.

26. The apparatus of claim 21 and wherein the packet switch is an ATM packet switch.

27. A packet switch for switching packets, each of said packets having a virtual circuit path, the packet switch comprising:

input ports for receiving packets and output ports for outputting packets, a memory for storing packets, said memory operably connected to said input ports and output ports, a packet router operably connected to said memory, which in a first mode is operable to route a first packet stored within the memory to a first output port, the first output port being specified by the virtual circuit path of the first packet, and in a second mode is operable to route a second packet stored within the memory to a second output port not specified by the virtual circuit path of the second packet, wherein the packet router operates in both modes during normal operation.

28. The packet switch of claim 27 wherein the memory is shared by a plurality of output ports.

29. The packet switch of claim 27 wherein the first output port comprises a dedicated output port and the second output port comprises a shared output port.

30. A method for use in packet switching comprising the steps of:

inputting a plurality of packets, storing said packets in a first memory at particular packet addresses, storing the particular packet addresses in a second memory comprising one or more output queues, each output queue having a length, retrieving a packet address from each output queue, using the packet address to retrieve the corresponding packet in the first memory, and routing the corresponding packet to an output port which is dedicated to that particular output queue, and retrieving an extra packet address from at least one output queue based on the length of one or more output queues, using the extra packet address to retrieve a corresponding extra packet in the first memory, and routing the corresponding extra packet to an output port.

31. The method of claim 30 wherein the packet addresses are stored in a plurality of output queues, and the corresponding extra packet retrieved is sent to a shared output port which is shared by at least two of the plurality of output queues.

32. The method of claim 31 wherein an extra packet address is retrieved from the longest output queue and the corresponding extra packet is sent to a shared output port.

* * * * *